Figure 1:
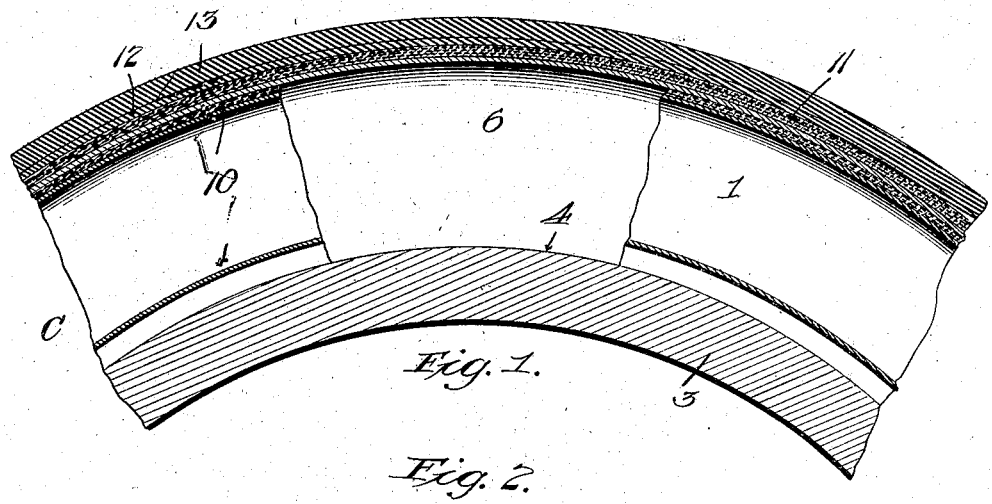

No. 885,062. PATENTED APR. 21, 1908.
H. D. B. LEFFERTS.
REINFORCED PNEUMATIC TIRE.
APPLICATION FILED MAR. 8, 1907.

Witnesses
J. L. Mackarie
R. C. Braddock.

Inventor
Henry D. B. Lefferts
By D. T. Wolhaupter
Attorney

UNITED STATES PATENT OFFICE.

HENRY D. B. LEFFERTS, OF ORANGE, NEW JERSEY, ASSIGNOR OF ONE-HALF TO ELIPHALET DE CAMP, OF NEWARK, NEW JERSEY.

REINFORCED PNEUMATIC TIRE.

No. 885,062.

Specification of Letters Patent.

Patented April 21, 1908.

Application filed March 8, 1907. Serial No. 361,279.

*To all whom it may concern:*

Be it known that I, HENRY D. B. LEFFERTS, a citizen of the United States, residing at Orange, county of Essex, and State of New Jersey, have invented certain new and useful Improvements in Reinforced Pneumatic Tires, of which the following is a specification.

This invention relates to tires for automobiles and other vehicles and has special reference to tires of the pneumatic or cushion type.

To this end the invention contemplates a reinforced pneumatic tire, possessing special utility in its application to automobiles or similar vehicles, and embodying in its organization a reinforced and protected outer tire casing. In this connection the invention has specially in view the construction of the outer casing of a pneumatic tire in such a manner as to thoroughly reinforce the same throughout its entire circumferential and cross sectional areas without impairing its resiliency, while at the same time providing an effective reinforcement against the blowing out of the tire casing after slight wear and where a poor grade of stock or material has been utilized in the manufacture of the casing.

A further object of the invention is to provide a resilient reinforcement of the character indicated which shall be so arranged within the body of the tire casing as to present no sharp edges at all to the parts pressing thereagainst, thus entirely obviating the cutting of the tire as is the case with many types of protected tires employing metal shields presenting edges or openings to the yielding body of the tire.

Another and distinctive object of the invention is to provide a resilient reinforcement for the tire casing, so constructed and arranged as to carry the reinforcement within the holding hooks at the base edges of the casing so as to stiffen these hooks against working out of the wheel rim after slight wear as frequently occurs in the non-reinforced types of tire casings.

A further object is to provide a reinforcement of the character described which not only secures the results noted, but also acts in the capacity of a non-puncturable shield which protects the inner tube of the tire from being punctured.

With these and many other objects in view, which will more readily appear as the nature of the invention is better understood, the same consists in the novel construction, combination, and arrangement of parts hereinafter more fully described, illustrated, and claimed.

The essential features of the invention involved in carrying out the objects above indicated are necessarily susceptible to structural change without departing from the scope of the invention, but a preferred embodiment thereof is shown in the accompanying drawings, in which:—

Figure 2:
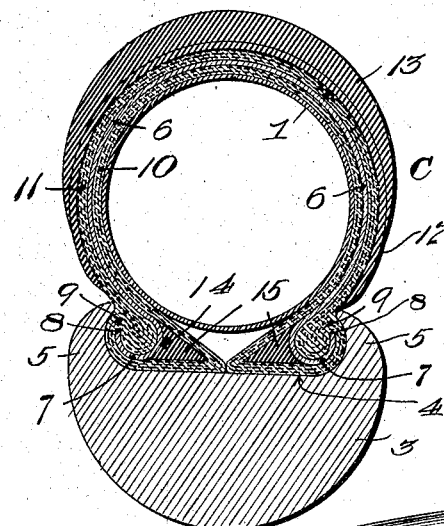
Figure 3:
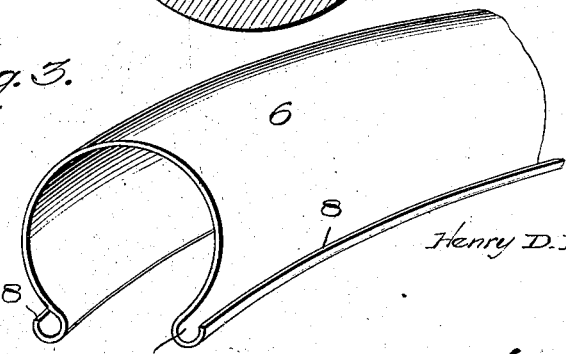

Figure 1 is a central longitudinal sectional view of a portion of a pneumatic tire embodying the present invention. Fig. 2 is a cross sectional view thereof. Fig. 3 is a sectional perspective view of the cylindrical steel reinforcement shell.

Like references designate corresponding parts in the several figures of the drawings.

In carrying out the present invention, the same may be embodied in any approved type of pneumatic tire employing outer and inner tubes, that is, an outer casing tube and an inner air tube; but in all embodiments thereof the invention is intended to be associated with those types of pneumatic tires employing circumferentially split casings enveloping the inner tube and provided at their edges with holding hooks designed to have an interlocking engagement with the retaining flanges of the wheel rim. Hence, for illustrative purposes there is shown in the drawings a form of pneumatic tire to which the invention is specially applicable, and referring to this type of tire, the same comprises in its general organization an outer tire casing designated in its entirety by the reference letter C, and an inner inflatable air tube 1, said casing and inner air tube being adapted to be arranged upon the wheel rim 3 having in the face thereof a circumferential tire seat 4 provided at its side edges with the inturned retaining flanges 5 with which are adapted to interlock the holding hooks of the tire casing C in the well known manner, as will hereinafter be further mentioned.

The distinctive feature of the present invention resides in the formation of the outer tire casing C to provide a non-puncturable resilient reinforcement therefor throughout its entire extent, both circumferentially and cross sectionally, which reinforcement is carried into the holding hooks of the casing as hereinafter pointed out. The resilient reinforcement referred to is in the form of a cross sectionally cylindrical steel shell designated by the numeral 6 and which in cross section is in the form of a divided or split cylinder, and in the direction of its length or circumferentially is co-extensive with the body of the tire casing C so that said shell 6, when incorporated in the body of the casing as an integral and intimate part thereof, reinforces said casing from edge to edge and throughout its entire extent. The said inner steel shell 6 is imperforate throughout so as to present no openings or cutting edges of any character to the material of the tire casing and at its circumferential side edges the said shell is provided with what may be characterized as terminal curled reinforcing beads 7 having outwardly and upwardly turned portions 8 designed to lie within and following the contour of the holding hooks 9, which are provided at the outside corners of the base edges of the casing C. It will be observed that in the tire casing C shown in the drawings, this casing is of the longitudinal split type and preferably consists of a built-up laminated tubular body comprising a plurality of layers 10 and 11 of canvas and rubber sheets which are vulcanized together with the rest of the casing body in the final process of vulcanization, as is well understood by those familiar with the art, but in connection with the inner embedded steel shell 6, the canvas and rubber sheets 10 may be referred to as the inside layers of the casing, and the sheets 11 as the outside layers of the casing, the outermost of said outside layers 11 having vulcanized thereon the rubber surface sheet 12 upon which latter is also vulcanized the outer thick tread piece 13.

In connection with the foregoing elements the present invention contemplates incorporating the steel reinforcement shell 6 into the tire body between the inside and outside layers 10 and 11 of the canvas and rubber sheets, and having the curled reinforcing beads 7 of said shell arranged to lie within and bear against the outer curved bearing seats 14 formed in the outer sides of the triangular base rings 15, about which rings are carried and vulcanized both the inner and outer laminæ of the canvas and rubber sheets 10 and 11. By reason of this construction, the base rings 15, which are made of hard rubber or equivalent material, are incorporated directly in the casing body at the base edges thereof and serve to materially stiffen and strengthen these edges, while at the same time affording a backing for the terminal edges of the reinforcement shell 6. Furthermore, it will be observed that at the outside corners of the base edges of the casing the outer laminæ 11 of the casing body are folded and rounded to produce the outer holding hooks 9 and are vulcanized within and without the beads 7 and around the outwardly and upturned portions 8 so that the latter stiffen and reinforce the holding hooks and thereby prevent the casing from blowing out as frequently occurs after slight wear on the holding hooks, and when a poor grade of material has been used in the construction of the tire.

It will be well understood by those familiar with the art that after building up the various parts of a tire upon or within a mold into the form shown in Fig. 2 of the drawings, the casing as an entirety is subjected to the vulcanizing process which intimately unites the various parts in the usual way.

From the foregoing it is thought that the construction and many advantages of the herein described tire casing will be readily apparent to those familiar with the art without further description.

I claim:

1. In a pneumatic tire, the tire casing provided within its rim engaging portions with circumferential base rings, and an inside steel shell extending entirely about the casing body within the same and having its terminals seated directly on one side of said base rings to provide a solid bearing for said terminals.

2. In a tire of the class described, the outer tire casing provided at its rim engaging edges with circumferential base rings having bearing seats, and with holding hooks for engagement with the wheel rim, and a steel shell extending entirely about the casing body within the same and having curled reinforcing beads resting on said bearing seats and disposed within the projections forming said holding hooks.

3. In a tire of the class described, the tire casing consisting of a laminated body provided at its outer corners with rim engaging holding hooks and having base rings incased in its edges, and an imperforate cross sectionally cylindrical steel shell embedded within the laminated casing body and provided with curled reinforcing beads at its terminal edges, said reinforcing beads being seated against the base rings, and having their edge portions disposed within the projections forming the holding hooks.

In testimony whereof I hereunto affix my signature in the presence of two witnesses.

HENRY D. B. LEFFERTS.

Witnesses:
 ARTHUR J. McDEVITT,
 WALTER MERRICK.